(12) United States Patent
Moors et al.

(10) Patent No.: US 7,853,119 B2
(45) Date of Patent: Dec. 14, 2010

(54) VIDEO RECORDER CONTROL USING STREAMED DATA PACKETS

(75) Inventors: Eric Wilhelmus Josephus Moors, Someren (NL); Roland Peter Jan Mathijs Manders, Horst (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1167 days.

(21) Appl. No.: 10/537,450

(22) PCT Filed: Nov. 26, 2003

(86) PCT No.: PCT/IB03/05488

§ 371 (c)(1),
(2), (4) Date: Jun. 3, 2005

(87) PCT Pub. No.: WO2004/054271

PCT Pub. Date: Jun. 24, 2004

(65) Prior Publication Data

US 2006/0045477 A1    Mar. 2, 2006

Related U.S. Application Data

(60) Provisional application No. 60/432,315, filed on Dec. 6, 2002.

(51) Int. Cl.
H04N 5/91 (2006.01)
H04N 7/00 (2006.01)

(52) U.S. Cl. .......................................... 386/83; 386/46

(58) Field of Classification Search ................... 725/58, 725/134; 386/1, 46, 68, 83, 95; 370/473, 370/498, 394, 389
See application file for complete search history.

(56) References Cited

U.S. PATENT DOCUMENTS

| 5,956,455 | A | 9/1999 | Hennig | |
|---|---|---|---|---|
| 6,163,316 | A | 12/2000 | Killian | |
| 6,618,396 | B1 * | 9/2003 | Mitui et al. | 370/474 |
| 6,754,437 | B1 * | 6/2004 | Hirai et al. | 386/83 |
| 6,792,617 | B2 * | 9/2004 | Gorbatov et al. | 725/110 |
| 6,925,247 | B2 * | 8/2005 | Kim et al. | 386/68 |
| 7,142,777 | B1 * | 11/2006 | Ohno | 386/95 |
| 2001/0033738 | A1 | 10/2001 | Milnes et al. | |
| 2002/0012525 | A1 | 1/2002 | Yuen | |

FOREIGN PATENT DOCUMENTS

WO    WO0122729    3/2001

OTHER PUBLICATIONS http://625.uk.com; PDC (Programme Delivery Control) Explained; Version 5.5; Sep. 1, 2000.

* cited by examiner

*Primary Examiner*—Marsha D Banks Harold
*Assistant Examiner*—Marc Dazenski

(57) ABSTRACT

An apparatus (16) for recording a selected program includes a decoder (32), a recorder (34), and a user interface (36). The user interface (36) permits a user to select the program. The decoder (32) receives a data stream including, a start data packet, content data packets, and an end data packet associated with the selected program. The decoder (32) detects the start data packet associated with the selected program and begins the recorder (34) recording. The context data packets are recorded until the decoder (32) detects the end data packet associated with the selected program and stops the recorder (34).

19 Claims, 2 Drawing Sheets

VIDEO RECORDER CONTROL USING STREAMED DATA PACKETS

CROSS REFERENCE TO RELATED APPLICATIONS

This application claims the benefit of U.S. provisional application Ser. No. 60/432,315 filed Dec. 6, 2002, which is incorporated herein by reference.

The invention relates to the field of video recording. It finds particular application in conjunction with controlling a video recorder for program recording through the detection of data packets in a private stream that is associated with the program to be recorded and will be described with particular reference thereto. However, it is to be appreciated that the invention is also amenable to other applications.

Many television (TV) viewers wish to select, schedule, and record their TV viewing opportunities to enhance the TV viewing experience. To do this, many select programs for viewing after consulting a paper or electronic programming schedule to determine the programs available during particular time slots. Others change from channel to channel in an attempt to locate desirable programming, with varying degrees of success.

As the number of TV channels and TV programs continues to increase, allowing viewers to more intelligently select, schedule, and record their viewing opportunities becomes increasingly important. An existing technique for electronically accessing program scheduling information includes periodically downloading scheduling information and, in response to requests from the viewer, providing this scheduling information in raw form to the viewer.

It is well known that very often problems occur when a user attempts to program his VCR to record a TV show at a given time and date. To eliminate these problems VPS (Video Program System) and VPT (VCR Programmed by Teletext) were introduced. These systems are in common use in Europe. VPT was formerly known as VPV (Videotext Programmed VCR).

The original purpose of adding a supplementary VPS signal to the image-representative TV broadcast signal was to simplify the use of home videocassette recorders (VCR's). Prior to the introduction of VPS, these VCR's were programmed by means of a timer, which started and stopped the VCR according to the time when the desired TV program of interest was scheduled for transmission.

Occasionally, the program of interest could not be correctly recorded, for example, due to a delay in the completion of the previous TV program. The VPS signal was intended to overcome this drawback by providing an accurate indication of the starting time of a new program.

The VPS program identification code occupies four bytes on a data line in the vertical blanking (retrace) interval of a TV broadcast signal. The four bytes of the VPS signal contain information such as day and time of day of the originally scheduled start of a particular TV program to be broadcast.

To make the programming of VCR's even more convenient, the VPT system was developed. VPT involves the automatic transfer of the necessary information to a VCR from the program pages of the teletext service. The user causes the display of a directory of teletext program pages, and moves a cursor to the desires TV program title. Upon pressing an appropriate button on a remote control, the necessary VPS program identification information is transferred to the VCR.

It should be mentioned that the scheduled time and the VPS-time are not always identical. This is because the scheduled time is updated whenever a particular program runs overtime and subsequent programs are delayed or a schedule is otherwise changed. The VPS time always remains unchanged since it is assigned to the program and not to the actual final broadcast time.

By use of VPS and VPT, incorrect recording of a desired TV program, caused either by time-shifted TV programs or by errors made by manual keying in of the data such as start time stop time, date, and program source (channel), is thus greatly reduced. Unfortunately, even if the VPS and VPT systems are used, the recording of the desired TV program can still fail because of VPT or VPS errors originating from the studio side. TV programs are announced on VPT program schedule pages two weeks in advance. If such a page contains incorrect VPS data and a VCR is programmed with the incorrect data, the recording of that particular TV program will, of course, fail. Usually, such errors are noticed and corrected by the editors of these pages sometime after the incorrect data is entered. Even though such errors are later corrected on the VPT pages by the editor, a conventional VCR cannot adapt its preprogrammed data to such corrections. Another source of errors which may prevent the recording of desired TV programs is the entry of incorrect VPS codes onto data line 16, also caused by mistakes made at the broadcaster side.

U.S. Pat. No. 5,956,455 to Hennig discloses a VCR including a VPS and VPT automatic programming capability that continuously compares preprogrammed VPS data to incoming VPS time codes for the currently running program, and to VPS program schedule information. In this way, the VPS and VPT controller in the VCR can detect errors in the original schedule pages from which it was programmed, and correct for those errors in its own record programming memory. Moreover, circuitry detects an error in the VPS code of a currently-running TV show, corrects for the error, and properly records the show.

However, the approach disclosed in the Hennig patent requires substantial processing overhead. Moreover, the accuracy of the Hennig approach to VCR recording is limited because it does not consistently update program scheduling information at the precise times when starting and stopping of the VCR is required. There is, therefore, a need for an apparatus and improved method for controlling video recording that is more precise with respect to starting and stopping a recorder.

In one embodiment of the invention, an apparatus for recording a selected program includes a means for selecting the selected program, a means for receiving a data stream, a start data packet, and an end data packet associated with the selected program, a means for detecting the start data packet associated with the selected program, a means for recording the selected program after the start data packet associated with the selected program is detected, a means for detecting the end data packet associated with the selected program, a means for stopping the recording after the selected program is over.

In another embodiment of the invention, a method for recording a selected program with a video recorder is provided. A data stream associated with the selected program is received. A start data packet associated with the selected program is received and detected. The recording of the selected program with the video recorder is started. The content data packets associated with the selected program are received. An end data packet associated with the selected program is received and detected. The recording of the selected program with the video recorder is stopped.

One advantage of the invention is video recording of a selected program does not miss any portion at the beginning or end of the selected program.

An additional advantage is a video recording of a selected program includes little or no material at the beginning or end of the recording from other programs or advertisements.

Other advantages will become apparent to those of ordinary skill in the art upon reading and understanding the following detailed description.

The drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. Within the drawings, like reference numerals denote like elements and similar reference numerals (e.g., 116, 216) denote similar elements.

Figure 1:
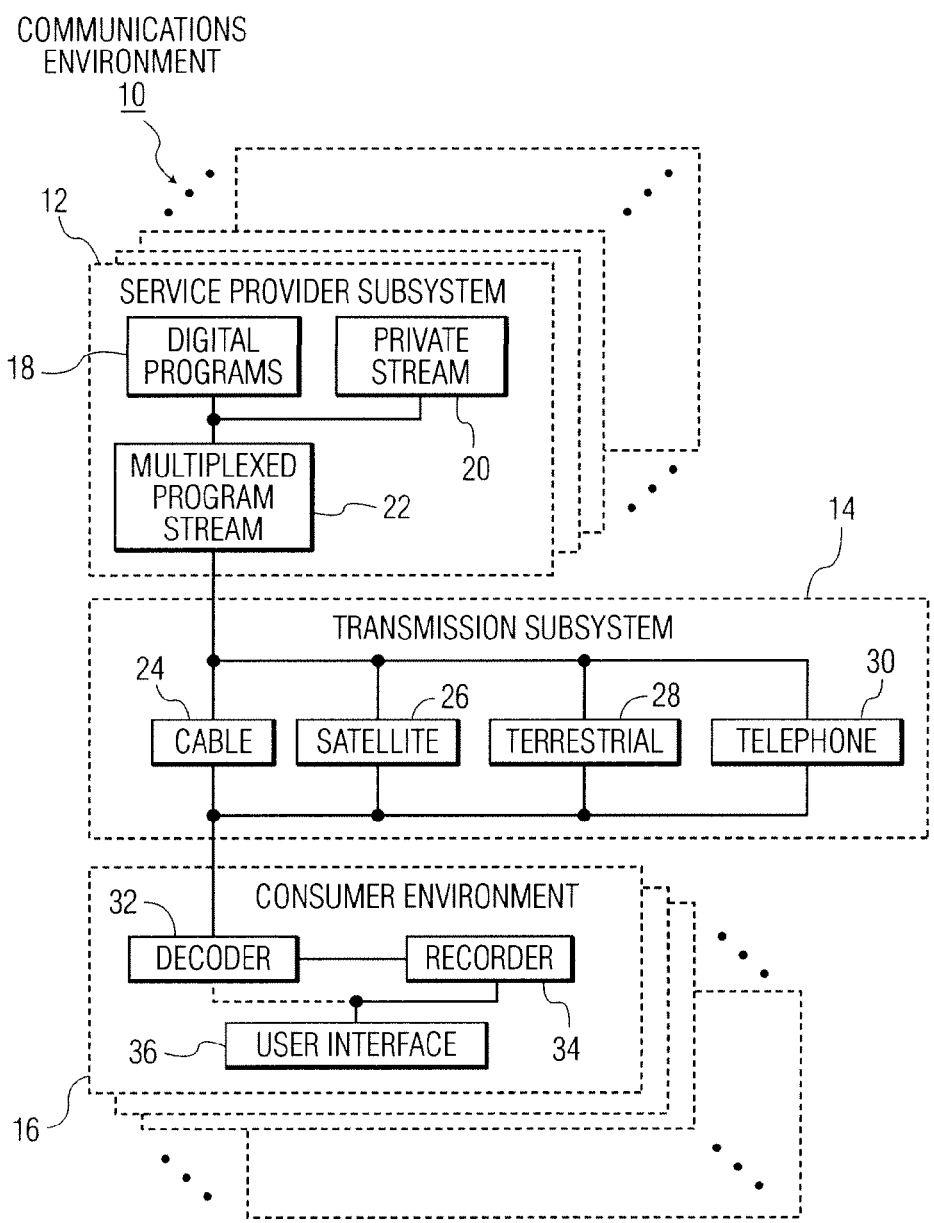
FIG. 1 is a block diagram of an embodiment of a communications environment incorporating the invention.

With reference to FIG. 1, a communications environment 10 includes a plurality of program/service provider subsystem 12, a transmission subsystem 14, and a plurality of consumer environments 16. Generally, each program/service provider subsystem 12 provides the multiple consumer environments 16 with access to programs via multiple communication channels. The programs are compatible with televisions and similar types of video display devices. Typically, a consumer environment is a home or apartment, but the invention equally applies to any type of consumer environment, including a vehicle, an office, and a business. An example of a business environment that may implement this invention is a business that sells video recorders to consumers.

Each program/service provider subsystem 12 depicted in FIG. 1 includes one or more digital programs 18 in the form of a series of packets with headers that identify the programs. This program/service provider subsystem 12 reflects one communication channel that incorporates aspects of the invention. The programs 18 can be various types, including movies, news, documentaries, situation comedies, sporting events, etc. The programs 18 can also be any duration and can begin and end at various times. A private stream 20 includes data packets associated with the one or more programs. A multiplexed program stream 22 forms a communication channel by combining the one or more programs 18 and the private stream 20 in a multiplexed fashion. If multiple programs 18 are simultaneously provided in the multiplexed program stream 22, the channel includes sub-channels for each multiplexed program. In actuality, a typical program/service provider subsystem 12 includes multiple channels. Additional channels may be similar to the one shown, although the program/service provider subsystem 12 may also include other channels that are not similar. The programs 18, the private stream 20, and the multiplexed program stream 22 may be provided by a common program/service provider. However, the programs 18 and the private stream 20 may also be provided by one or more third parties.

The transmission subsystem 14 includes at least one of cable 24, satellite 26, terrestrial 28, and telephone 30. The cable transmission method 24 is primarily associated with cable TV service providers. The satellite transmission method 26 is primarily associated with satellite TV and satellite telephone service providers. The terrestrial transmission method 28 is primarily associated with terrestrial broadcasters and cellular telephone service providers. The telephone transport method 30 is primarily associated with residential/commercial telephone service providers and may include optical or electrical transmission lines.

Each consumer environment 16 includes a decoder 32, a recorder 34, and a user interface 36. These modules may be packaged in various configurations. For example, all of the modules may be packaged in a television (TV) or a set-top box. Alternatively, the decoder 32 may be packaged in a set-top box and the recorder 34 may be packaged individually. The user interface 36 is typically operationally coupled to the recorder. Alternatively, the user interface 36 may be operationally coupled to the decoder 32 or to both the recorder 34 and decoder 32. Other configurations, for example, where the user interface 32 utilizes the TV to display options are also possible. The user interface 32 may be a multi-function device that also controls the TV and other related equipment. The invention does not require or rely on any particular packaged configuration.

When one of the one or more programs 18 is selected for recording via the user interface 36, the decoder 32 receives the multiplexed program stream 22 for the communication channel via, for example, the cable transport method 24. Selection of the program to be recorded may be in any of various methods, including various selection methods using an electronic program guide (EPG), various selection methods using a video programming system (VPS), various methods using VCR programmed by Teletext (VPT), and traditional tuning of the recorder, decoder, TV, or other device to the program to be recorded.

Next, the private stream 20 is separated from the multiplexed program stream by the decoder 32 in a de-multiplex fashion. Data packets in the private stream 20 are detected by the decoder 32. The data packets identify the start and end of programs included in the multiplexed program stream 22. The data packets associated with a program identify when a program starts and stops. When the data packets associated with the selected program are detected, the decoder 32 controls the recorder 34 to start and stop recording so that no program content is missed.

Figure 2:
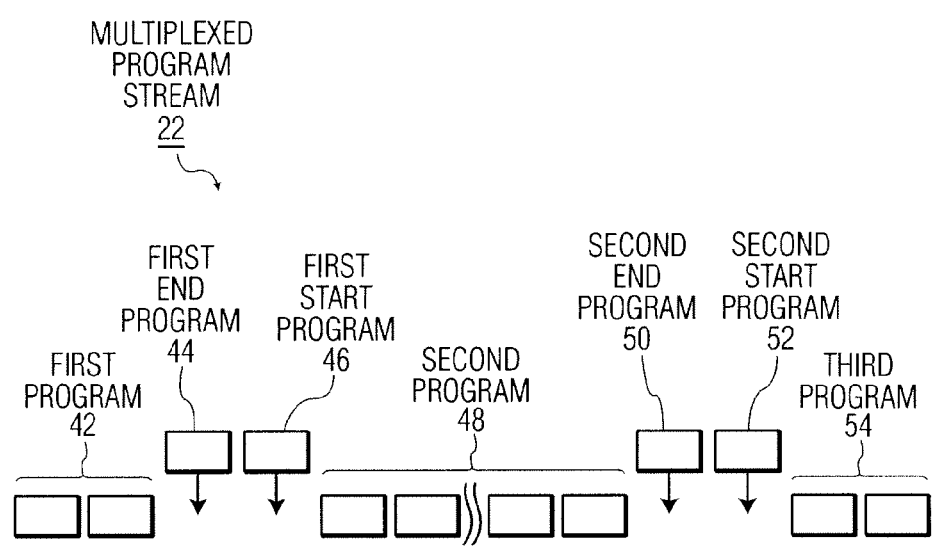
FIG. 2 is a diagram showing an embodiment of a multiplexed program stream incorporating the invention.

With reference to FIG. 2, an example of a multiplexed program stream 22 includes three consecutive programs with data packets from the private stream separating the programs. In this example, the multiplexed program stream 22 includes packets associated with a first program 42, a first end data packet 44, a first start data packet 46, packets associated with the second program 48, a second end data packet 50, a second start data packet 52, and packets associated with a third program 54.

With reference to FIGS. 1 and 2, the first end data packet 44 is associated with the first program 42 and indicates that the first program 42 has ended. In the time domain, the first end data packet 44 follows the packets associated with the content of the first program 42. Therefore, detection of the first end data packet 44 by the decoder 44 may be used, for example, to stop the recording of the first program 42 by the recorder 34.

The first start data packet 46 is associated with the second program 48 and indicates that the second program 48 is about to start. In the time domain, the first start data packet 46 precedes the packets associated with the content of the second program 48. Therefore, detection of the first start data packet 46 by the decoder 44 may be used, for example, to start the recording of the second program 48 by the recorder 34.

Similarly, the second end data packet 50 is associated with the second program 48 and may be used, for example, to stop the recording of the second program 48. Additionally, the second start data packet 52 is associated with the third program 54 and may be used, for example, to start the recording of the third program 54.

If multiple programs 18 are simultaneously provided in the multiplexed program stream 22, data packets from two or more programs are time-multiplexed during the first program, second program, and third program. Start data packets associated with each program precede the initial data packet associated with the program content. End data packets associated with each program follow the last data packet associated with the program content. As such, the sequence and position of the start and stop data packets from the private stream 20 for the multiple programs within the multiplexed program stream 22 is based on the position of the initial and last data packets for the program content in the multiplexed program stream 22. The start and end data packets may include information that associates them with a particular program to provide additional flexibility in packet positioning and additional confidence in controlling the recorder.

In another embodiment, end and start packets identifying the ending of one program and the starting of another program in the same channel/sub-channel could be combined into one packet to reduce overhead. In various embodiments, the private stream could be inserted in different levels of the multiplex. For example, the private stream could be one of multiple programs included in the multiplexed program stream and defined in the packet identifier (PID) mapping table (PMT) of that program. In this embodiment, the start and end packets would need to include program identification information for the program content with which they are associated. On the other hand, the private stream could be a channel or sub-channel separate from the channels and/or sub-channels carrying the program content. In this embodiment, the start and end packets would need to include channel/sub-channel identification information for the program content with which they are associated.

In another embodiment, the start and stop packets are added by a third party subscription service. Start and stop packets can also be added before and after commercials, or other auxiliary parts of the programs.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

Having described the preferred embodiments, the invention is now claimed to be:

1. An apparatus for recording a selected program, comprising:
   a) a means for selecting the selected program;
   b) a means for receiving a data stream, a start data packet and an end data packet for the selected program;
   c) a means for detecting the start data packet for the selected program and the end data packet for the selected program; and
   d) a means for recording the selected program, the recording being initiated in response to the detection of the start data packet for the selected program and terminated in response to the detection of the end data packet for the selected program,
   wherein the data stream includes one or more programs and a private stream, each program being represented by content data packets in the data stream, the private stream including the start data packet and the end data packet for the selected program and a start data packet and an end data packet for each additional program and the start data packet precedes the associated content data packets in the data stream for each program and the end data packet follows the associated content data packets in the data stream for each program and the end data packet of a preceding program and the start data packet for a following program are combined in a common data packet.

2. The apparatus as set forth in claim 1, wherein the data stream includes one or more programs, wherein each program is represented by content data packets in the data stream, the start data packet and the end data packet being in a private stream, which also includes a start data packet and an end data packet associated with individual additional programs or program segments.

3. The apparatus as set forth in claim 2 wherein the associated start data packet in the private stream is provided in advance of the associated content data packets in the data stream for each program and the associated end data packet in the private stream is provided after the associated content data packets in the data stream for each program.

4. The apparatus as set forth in claim 3 wherein each end data packet of a preceding program and the start data packet associated with a succeeding program are combined in a common data packet.

5. The apparatus as set forth in claim 1 wherein the start data packet and the end data packet include information that identifies the selected program.

6. The apparatus as set forth in claim 1 wherein the data stream includes multiple programs, each program being associated with a sub-channel, the start data packet and the end data packet including information that identifies the selected program and the sub-channel associated with the selected program.

7. The apparatus as set forth in claim 1 wherein the data stream is associated with a first channel, the start data packet and the end data packet are associated with a private stream and a second channel, the start data packet and end data packet including information that identifies the selected program and the channel associated with the selected program.

8. The apparatus as set forth in claim 1 wherein the data stream is a digital data stream and includes one or more programs, each program in the data stream being represented by digital content data packets, and the means for recording the selected program including a digital recorder to record the digital content data packets.

9. A method for recording a selected programming with a video recorder comprising:
   a) receiving a data stream associated with the selected programming;
   b) receiving and detecting a start data packet for the selected programming;
   c) starting the recording with the video recorder in response to the detection of the start data packet;
   d) receiving and recording the selected programming;
   e) receiving and detecting an end data packet for the selected programming;
   f) stopping the recording of the selected programming in response to the detecting of the end data packet; and
   (g) combining one or more programs and a private stream to produce the data stream, each program being represented by content data packets in the data stream, the private stream including a start data packet and an end data packet for each program; and
   providing the data stream to a consumer environment having the video recorder,
   wherein the start data packet precedes the associated content data packets in the data stream for each program and the end data packet follows the associated content data packets in the data stream for each program and each end data packet and the start data packet for a succeeding program are combined in a common data packet.

10. The method as set forth in claim 9 wherein the data stream is a digital data stream and includes one or more programs including the selected programming, each program in the data stream being represented by digital content data packets.

11. The method as set forth in claim 9, further including before step a):
  combining one or more programs to produce the data stream, each program being represented by content data packets in the data stream;
  combining a start data packet and an end data packet associated with each program to produce a private stream; and
  providing the data stream and the private stream to a consumer environment having the video recorder.

12. The method as set forth in claim 11 wherein the associated start data packet in the private stream is provided in advance of the associated content data packets in the data stream for each program and the associated end data packet in the private stream is provided after the associated content data packets in the data stream for each program.

13. The method as set forth in claim 12 wherein each end data packet of a preceding program and the start data packet associated with a succeeding program are combined in a common data packet.

14. The method as set forth in claim 9 wherein the start data packet and the end data packet include information that identifies the selected program.

15. The method as set forth in claim 9 wherein the data stream includes:
  multiple programs, each program being associated with a sub-channel;
  the start data packet and the end data packet including information that identifies the selected program and the sub-channel associated with the selected program.

16. The method as set forth in claim 9 wherein the data stream is associated with a first channel, the start data packet and the end data packet are associated with a private stream and a second channel, and the start data packet and end data packet include information that identifies the selected program and the channel associated with the selected program.

17. A method for recording selected programming comprising:
  a) combining one or more programs to produce a data stream, the one or more programs including the selected programming, each program being represented by content data packets in the data stream;
  b) combining a start data packet and an end data packet for each program to produce a private stream; and
  c) providing the data stream and the private stream to a consumer environment having a video recorder;
  wherein the data stream is associated with a first channel, the start data packet and the end data packet are for a private stream and a second channel, and the start data packet and end data packet include information that identifies the selected program and the channel associated with the selected program.

18. The method as set forth in claim 17, further including:
  receiving the data stream associated with the selected programming;
  receiving and detecting the start data packet associated with the selected programming;
  starting the recording with the video recorder in response to the detection of the start data packet;
  receiving and recording the selected programming;
  receiving and detecting an end data packet associated with the selected programming; and
  stopping the recording of the selected programming in response to the detecting of the end data packet.

19. The method as set forth in claim 18 wherein the data stream is a digital data stream, each program in the data stream being represented by digital content data packets.

* * * * *